(12) United States Patent
Smith, Jr. et al.

(10) Patent No.: US 12,703,174 B2
(45) **Date of Patent: *Aug. 11, 2026**

(54) PACKAGING MATERIAL WITH INDICIUM IN METALLIC LAYER

(71) Applicant: Printpack Illinois, Inc., Elgin, IL (US)

(72) Inventors: Louis Douglas Smith, Jr., Temple, GA (US); John Ralph Bumgardner, Bremen, GA (US); Jeffery Allen Boekeloo, Acworth, GA (US); Rajesh Suryanarayanan, Powder Springs, GA (US)

(73) Assignee: Printpack Illinois, Inc., Atlanta, GA (US)

( * ) Notice: Subject to any disclaimer, the term of this patent is extended or adjusted under 35 U.S.C. 154(b) by 308 days.

This patent is subject to a terminal disclaimer.

(21) Appl. No.: 18/382,650

(22) Filed: Oct. 23, 2023

(65) Prior Publication Data

US 2024/0042733 A1 Feb. 8, 2024

Related U.S. Application Data

(62) Division of application No. 16/647,209, filed as application No. PCT/US2018/000373 on Sep. 21, 2018, now Pat. No. 11,813,820.

(Continued)

(51) Int. Cl.
*B32B 15/085* (2006.01)
*B32B 3/26* (2006.01)
(Continued)

(52) U.S. Cl.
CPC ............ *B32B 15/085* (2013.01); *B32B 3/266* (2013.01); *B32B 15/12* (2013.01); *B32B 15/20* (2013.01);
(Continued)

(58) Field of Classification Search
CPC ....... B32B 15/085; B32B 3/266; B32B 15/12; B32B 15/20; B32B 27/08; B32B 27/30;
(Continued)

(56) References Cited

U.S. PATENT DOCUMENTS 6,066,437 A 5/2000 Kosslinger
11,813,820 B2 11/2023 Smith, Jr. et al.
(Continued)

FOREIGN PATENT DOCUMENTS

WO 2004/045857 A2 6/2004
WO 2014/184630 A1 11/2014
(Continued)

OTHER PUBLICATIONS

International Search Report in counterpart International Application No. PCT/US2018/000373 dated Jan. 11, 2019, pp. 1-2.
(Continued)

*Primary Examiner* — James C Yager
(74) *Attorney, Agent, or Firm* — Additon, Pendleton & Witherspoon, P.A.

(57) ABSTRACT

In a packaging material that is, or includes, a laminate, the laminate includes first and second webs that are joined to one another. The first web includes a metallic layer on a second layer. The metallic layer is positioned between the second layer and the second web. Indicium is defined in at least the metallic layer. The packaging material is configured so that the indicium is visible from a first side of the packaging material, and the indicium is typically not visible from a second side of the packaging material. The indicium can be at least partially defined by holes in the metallic layer. The visibility of the indicium may be enhanced by the laminate including material that is a different color than the metallic layer, and the different color being at least partially visible through the indicium.

20 Claims, 5 Drawing Sheets

Related U.S. Application Data

(60) Provisional application No. 62/561,711, filed on Sep. 22, 2017.

(51) Int. Cl.

| | |
|---|---|
| ***B32B 15/12*** | (2006.01) |
| ***B32B 15/20*** | (2006.01) |
| ***B32B 27/08*** | (2006.01) |
| ***B32B 27/30*** | (2006.01) |
| ***B65D 33/00*** | (2006.01) |

(52) U.S. Cl.
CPC .............. *B32B 27/08* (2013.01); *B32B 27/30* (2013.01); *B65D 33/004* (2013.01); *B32B 2255/06* (2013.01); *B32B 2255/205* (2013.01); *B32B 2255/26* (2013.01); *B32B 2307/4023* (2013.01); *B32B 2307/412* (2013.01); *B32B 2307/414* (2013.01); *B32B 2439/46* (2013.01); *B32B 2439/70* (2013.01); *B65D 2203/00* (2013.01)

(58) Field of Classification Search
CPC .......... B32B 2255/06; B32B 2255/205; B32B 2255/26; B32B 2307/4023; B32B 2307/412; B32B 2307/414; B32B 2439/46; B32B 2439/70; B32B 2307/40; B32B 2307/402; B32B 15/08; B65D 33/004; B65D 2203/00
See application file for complete search history.

(56) References Cited

U.S. PATENT DOCUMENTS

| | | | |
|---|---|---|---|
| 2008/0075897 | A1 | 3/2008 | Keckeisen et al. |
| 2012/0152785 | A1 | 6/2012 | Benson et al. |
| 2016/0107420 | A1 | 4/2016 | Beardwell et al. |

FOREIGN PATENT DOCUMENTS

| | | | |
|---|---|---|---|
| WO | 2017/052913 | A1 | 3/2017 |
| WO | 2019/059958 | A1 | 3/2019 |

OTHER PUBLICATIONS

Markem Imaje, Product brochure for “SmartLase F200”, www.markem-imaje.com, France, (no date) pp. 1-2.
Written Opinion in counterpart International Application No. PCT/US2018/000373 dated Mar. 28, 2019, pp. 1-5.
International Preliminary Report on Patentability in counterpart International Application No. PCT/US2018/000373 dated Mar. 24, 2019, pp. 1-6.

PACKAGING MATERIAL WITH INDICIUM IN METALLIC LAYER

CROSS-REFERENCE TO PRIORITY APPLICATION

This application is a division of U.S. patent application Ser. No. 16/647,209, filed Mar. 13, 2020, which is the National Stage of International Patent Application No. PCT/US2018/000373, filed Sep. 21, 2018, which claims the benefit of U.S. Provisional Patent Application No. 62/561,711, filed Sep. 22, 2017. Each of the above-referenced patent applications is incorporated herein by reference in its entirety.

BACKGROUND

The present invention generally relates to packaging material and, more particularly, to packaging material that may be formed into a bag, wherein the bag may include indicium configured to be seen by viewing the inner surface of the bag.

SUMMARY

An aspect of this disclosure is the provision of a packaging material that is, or includes, a laminate. In an embodiment, the laminate includes first and second webs that are joined to one another, wherein the first web includes a metallic layer on a second layer, the metallic layer is positioned between the second layer and the second web, and indicium is defined in at least the metallic layer. In an embodiment, the packaging material is configured so that the indicium is visible from a first side of the packaging material, and the indicium is substantially not visible from a second side of the packaging material. The indicium can be at least partially defined by holes in the metallic layer. The visibility of the indicium may be enhanced by the laminate including material (e.g., ink, an interior layer, and/or other suitable material) that is a different color than the metallic layer, and the different color being at least partially visible through the indicium. The packaging material, or more specifically the laminate, can further include graphics that are visible from the second side of the packaging material.

The packaging material can be formed into a package that is configured so that the first web defines an inner surface of the package, and the indicium is positioned for being seen by viewing the inner surface of the package. For example, the package can include a seam connecting first and second portions of the laminate to one another, wherein the seam is configured to at least partially obstruct access to the interior space of the package.

Another aspect of this disclosure is the provision of a method for forming packaging material. The method can include laminating at least a first web and a second web to one another to at least partially form the packaging material. While the laminating is occurring, indicium can be defined (e.g., by laser ablation) in at least a metallic layer of the first web, wherein at least a portion of the defining can be performed at a position that is upstream from the laminating. The packaging material can be configured so that the indicium is visible from a first side of the packaging material, and the indicium is substantially not visible from a second side of the packaging material. The method can further include forming a portion of the packaging material into a package that is configured so that the first web defines an inner surface of the package, and the indicium is positioned for being seen by viewing the inner surface of the package.

The foregoing summary provides a few brief examples and is not exhaustive, and the present invention is not limited to the foregoing examples. The foregoing examples, as well as other examples, are further explained in the following detailed description with reference to accompanying drawings.

BRIEF DESCRIPTION OF THE DRAWINGS

The drawings discussed below are schematic, and features depicted therein are not drawn to scale. The drawings are provided as examples. The present invention may, however, be embodied in many different forms and should not be construed as limited to the examples depicted in the drawings.

DETAILED DESCRIPTION

Examples of embodiments are disclosed in the following. The present invention may, however, be embodied in many different forms and should not be construed as limited to the embodiments set forth herein. For example, features disclosed as part of one embodiment can be used in the context of another embodiment to yield a further embodiment.

Figure 1:
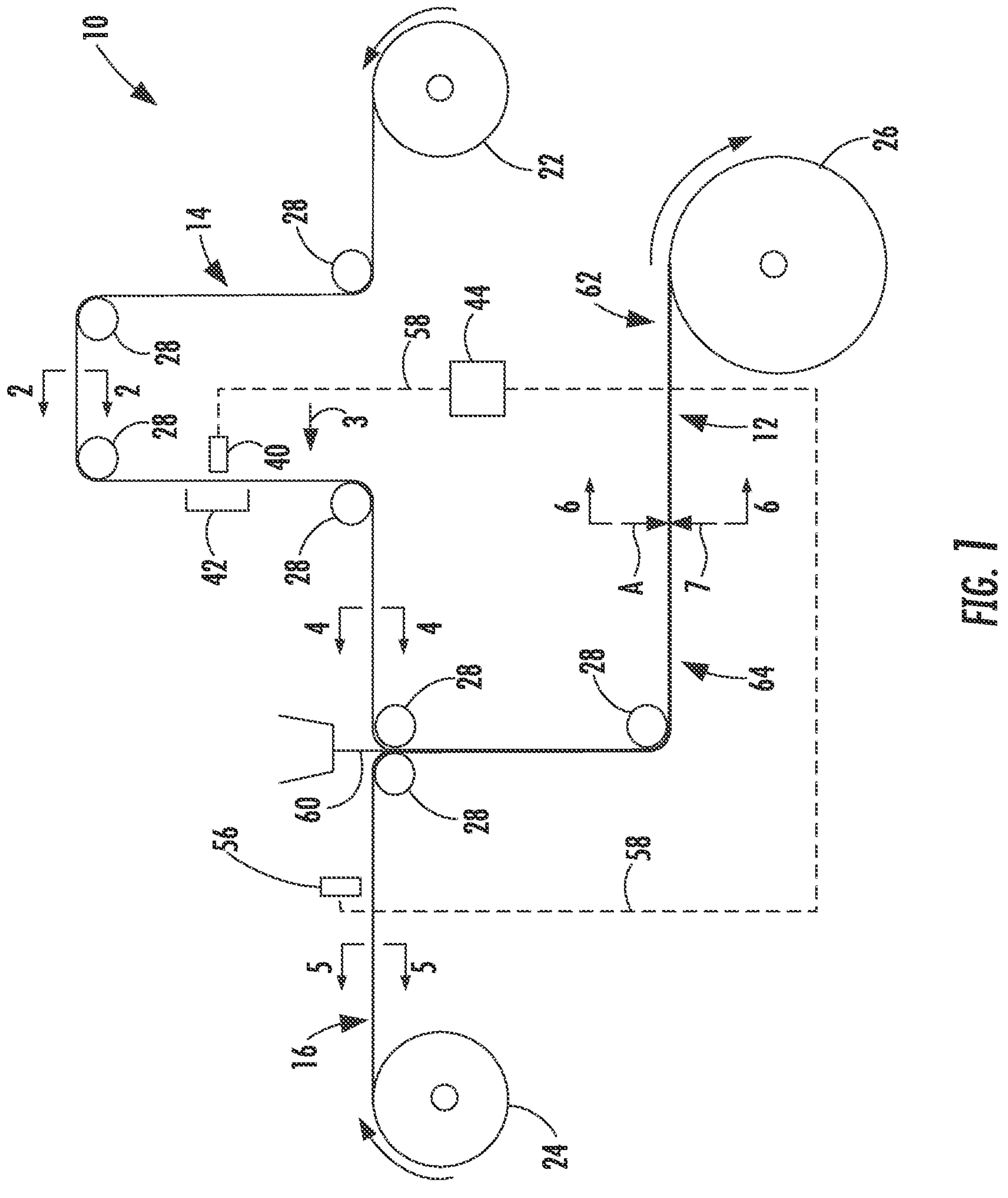
FIG. 1 is a side view of a system for forming packaging material, wherein the packaging material can be a laminate that includes indicium or indicia that is at least partially defined in an inner metallic layer, in accordance with an embodiment of this disclosure.

FIG. 1 schematically depicts a system 10 for forming packaging material 12, in accordance with an embodiment of this disclosure. The packaging material 12 can be formed by laminating at least a first web 14 and a second web 16 to one another, for example by extrusion lamination and/or adhesive lamination. Indicium, or more specifically indicia 18 (FIG. 3) can be formed, for example by laser 40, in at least a metallic layer 20 (FIGS. 2, 4 and 6) of the first web

14. The indicia 18 can be formed in the metallic layer 20 at a position upstream from where the laminating occurs.

In one embodiment of this disclosure, after the packaging material 12 is formed, it can be converted into packages such as, but not limited to, bags (e.g., see bag 70 of FIGS. 8 and 9), overwraps, and/or the like. In an example that will be discussed in greater detail below, the packaging material 12 can be cut into lengthwise strips (i.e., strips extending in the machine direction), and each strip can include a series of the indicia 18 that are spaced apart from one another in the lengthwise direction. Each strip can be supplied to a conventional form-fill-seal machine that converts the strip into bags. For each package, a portion of the first web 14 can define an inner surface of the package, so that the indicia 18 can be seen by viewing the inner surface of the package (e.g., the indicia 18 can be visible with a naked, bare or unaided eye when viewing the inner surface of the package). In contrast, for the embodiment depicted in the drawings, the indicia 18 is substantially not visible (e.g., not visible to a user (e.g., consumer) with a naked, bare or unaided eye) from the exterior of the package.

As an example, packages of this disclosure may be used in a sweepstakes contest or other suitable contests. A variety of contests are within the scope of this disclosure. For example, at least one of the indicia 18 can be a unique, predetermined identifier (e.g., number) that may be at least indirectly associated with one or more prizes. As a more specific example, the unique, predetermined identifier 18 may qualify the consumer in possession thereof to be entered into a contest associated with one or more prizes. It is believed that the contest may be like a lottery, raffle, and/or other suitable system for providing one or more prizes.

In an alternative embodiment, it is believed that the indicia 18 being substantially not visible from the exterior of the package may include some aspects of the indicia 18 being partially visible from the exterior of the package (e.g., to a user (e.g., consumer) with a naked, bare or unaided eye), wherein any such visibility is masked or obscured to a sufficient degree that the information conveyed by the indicia (e.g., the predetermined identifier) is not discernable (e.g., not discernable to a user (e.g., consumer) with a naked, bare or unaided eye). A variety of differently configured packaging materials 12 and packages are within the scope of this disclosure. For example, a wide range of indicia 18 are within the scope of this disclosure, as discussed in greater detail below.

Referring to FIG. 1 more specifically, the first and second webs 14, 16 can be respectively drawn from rolls 22, 24 and/or supplied in any other suitable manner. The web of packaging material 12 can be wound into a roll 26 and/or processed in any other suitable manner. The webs 12, 14, 16 can be respectively guided by rollers 28 and/or any other suitable features.

Figure 2:
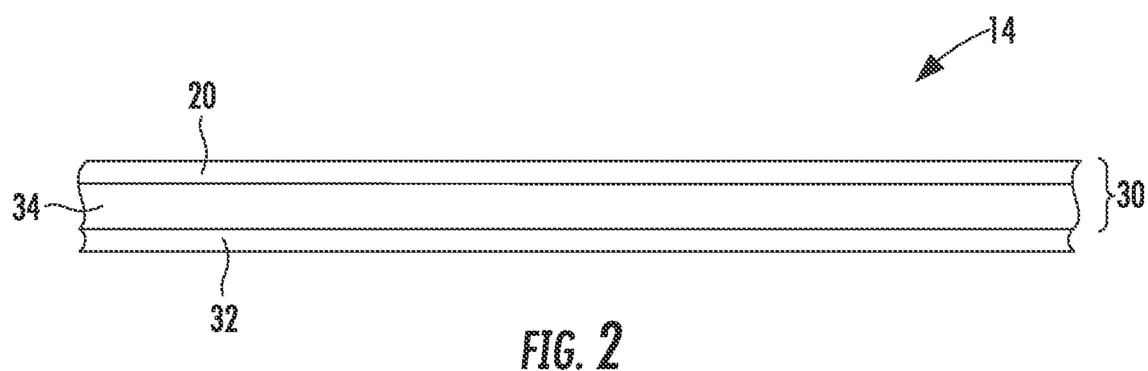
FIG. 2 is a cross-sectional view of a portion of a first web of FIG. 1, wherein the cross-section is taken along line 2-2 of FIG. 1.

Referring to FIG. 2, the first web 14 can be a metallized film 30 that can optionally further include a heat-sealable layer 32. The metallized film 30 can comprise, consist essentially of, or consist of a metallic layer 20 (e.g., aluminum) on an interior polymeric film 34. The heat-sealable layer 32 can be part of a film coextrusion that includes the interior polymeric film 34, wherein the film coextrusion can be biaxially oriented prior to adding the metallic layer 20 (e.g., prior to metallization). Alternatively, it is believed that the heat-sealable layer 32 may be a coating.

As one example, the interior polymeric film 34 can be a transparent and/or translucent polypropylene film. As other examples, the interior polymeric film 34 can comprise polyester or any other suitable material. As further examples, the interior polymeric film 34 can comprise bio-based materials (e.g., organic bio-based materials) such as, but not limited to, polylactic acid (PLA) and/or other suitable biodegradable and bioactive thermoplastic aliphatic polyesters derived from renewable resources. The interior polymeric film 34 can be transparent, translucent, at least partially opaque, colored and/or have any other suitable characteristics. The interior polymeric film 34 can be replaced with one or more other suitable materials, for example paper or any other suitable layer. The optional heat-sealable layer 32 (e.g., a layer of thermoplastic polymeric material that typically is transparent and/or translucent) can be on the opposite side of the interior film 34 from the metallic layer 20, so that the interior film 34 is positioned between the metallic layer 20 and the heat-sealable layer 32.

In the example depicted in FIG. 1, the first web 14 is drawn between a laser head 40 and an exhaust hood/laser shield 42 ("hood"), so that the outer surface of the heat-sealable layer 32 is in opposing face-to-face relation with the laser head, and the outer surface of the metallized film 30 is in opposing face-to-face relation with the hood 42. In an alternative embodiment, the outer surface of the heat-sealable layer 32 may be in opposing face-to-face relation with the hood 42, and the outer surface of the metallized film 30 may be in opposing face-to-face relation with the laser head 40.

The laser head 40 can be operatively associated with (e.g., at least partially controlled by) a computerized controller 44. As will be discussed in greater detail below, the laser head 40 can be operated to form a series of the indicia 18 that are spaced apart from one another in the lengthwise direction of the first web 14. There can be a series of similarly operating laser heads 40 spaced apart from one another in the direction crosswise to the machine direction ("crosswise direction").

Figure 3:
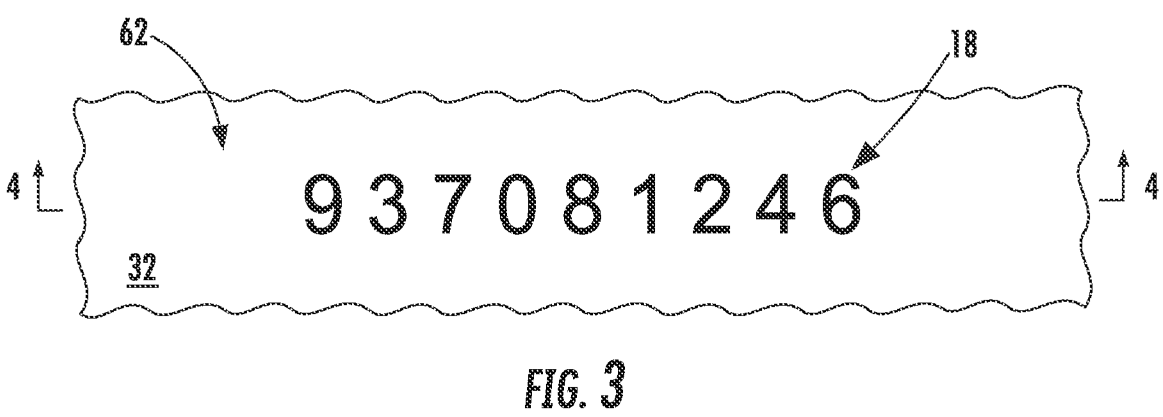
FIG. 3 depicts a portion of the first web after it has been marked with indicium or indicia, wherein arrow 3 in FIG. 1 indicates the line of sight for FIG. 3, and the line of sight is aligned with indicium or indicia of the first web.
Figure 4:
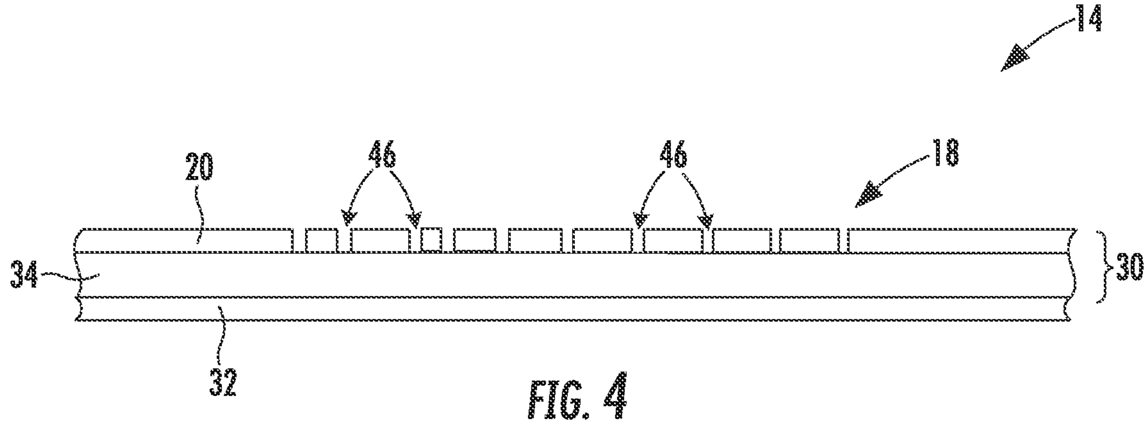
FIG. 4 is a cross-sectional view of a portion of the first web, wherein the cross-section is taken along lines 4-4 of FIGS. 1 and 3, and the cross section intersects indicium or indicia of the first web.

Referring also to FIGS. 3 and 4, the laser of the laser head 40 can be configured (e.g., can provide a laser beam having a predetermined wavelength) so that the laser beam projected from the laser head passes through both the interior film 34 and heat-sealable layer 32 without (e.g., substantially without) damaging (e.g., without melting) these layers. The laser beam, after passing through the interior film 34 and heat-sealable layer 32, reaches the metallic layer 20. The laser beam interacts with the metallic layer 20 in a manner that removes (e.g., ablates) predetermined portions of the metallic layer 20 to at least partially form the indicia 18.

FIG. 3 is a schematic view of a portion of the first web 14 after the indicia 18 has been formed in the metallic layer 20. In FIG. 1, arrow 3 indicates the line of sight for FIG. 3 (i.e., the line of sight 3 is toward the indicia 18 of FIG. 3). The indicia 18 can be any suitable indicium or indicia, for example a series of number(s), letter(s), graphic(s), symbol(s) and/or other suitably distinctive marking(s). In the drawings, the indicia 18 includes more than one indicium, although it is within the scope of this disclosure for the indicia to be replaced with a single indicium. As depicted in FIG. 3, the indicia 18 is a series of numbers, and the indicia/series of numbers extends in the crosswise direction. Alternatively, the indicia 18 can extend in the machine direction. Any suitable types and/or orientations of the indicia 18 are within the scope of this disclosure.

In the embodiment depicted in FIG. 4, the indicia 18 is at least partially defined by holes 46 in the metallic layer 20. The holes 46 can be formed in the metallic layer 20 by the ablating action of the laser beam projected from the laser head 40. The holes 46 may extend completely through the metallic layer 20. Alternatively, the holes 46 may extend partially into the metallic layer. The holes 46 may be of any suitable size and have any suitable shape.

Figure 5:
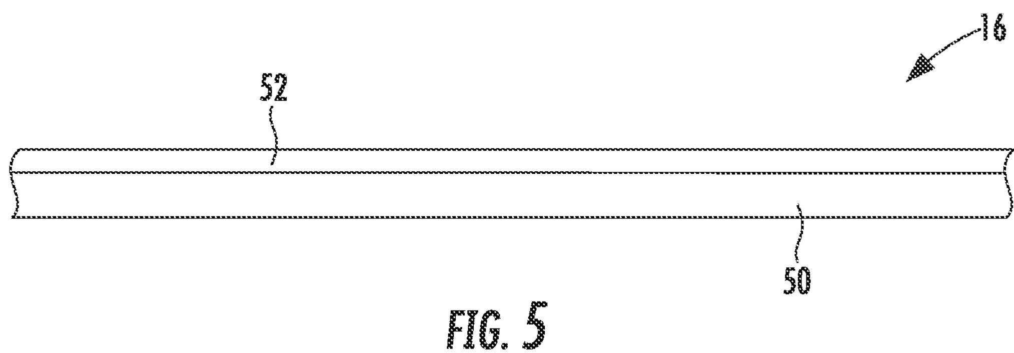
FIG. 5 is a cross-sectional view of a portion of a second web of FIG. 1, wherein the cross-section is taken along line 5-5 of FIG. 1.

Referring to FIG. 5, the second web 16 optionally can comprise, consist essentially of, or consist of at least one ink coating 52 on an outer polymeric film 50 (e.g., a transparent and/or translucent polypropylene film). The ink(s) 52 can define one or more graphics (e.g., see graphics 72 of FIGS. 8 and 9) that are visible through the outer polymeric film 50. Regarding such graphics in the embodiment in which the packaging material 12 is formed into packages, the graphics can be visible on the exterior of the packages. More specifically regarding the embodiment in which the packaging material 12 is formed into packages, the packaging material can be cut into lengthwise strips, and each strip can be supplied to a form-fill-seal machine that cuts the strip in the crosswise direction to form portions of the packaging material that are formed into packages. In such an embodiment, the ink(s) 52 of the second web 16 can form a graphic that is repeated in a two-dimensional array or pattern so that each portion of the packaging material that is formed into a package includes substantially the same graphic. Similarly, the ink(s) 52 of each of the portions of the packaging material 12 can include a conventionally configured eye mark (e.g., see eye mark 78 of FIG. 9). The eye marks of the second web 16 can be visible marks conventionally defined by a portion of the ink 52 and arranged in a conventional, regularly spaced pattern, so that the eye marks can be conventionally sensed by an optical sensor of a conventional form-fill-seal machine as part of a conventional process of forming packages. For example, in each of the portions of the packaging material 12, the eye mark can be positioned in one of the side margins of the portion. More generally, the second web 16, including its eye marks, can be conventional.

Alternatively, the second web 16, including its eye marks, may be configured in any other suitable manner. For example, the film 50 can be replaced with one or more other suitable materials, for example paper or any other suitable layer. For the film 50 or its replacement (e.g., paper or other suitable material), at least some of the ink 52, if present, may be on the outer side of the film 50 or its replacement. Optionally, any such outer ink 52 may be covered with a protective layer or coating (e.g., overlacquered). The film 50 may be replaced with one or more suitable materials in various combinations.

In the example depicted in FIG. 1, the second web 16 is drawn past at least one eye mark detector or reader (e.g., optical sensor 56). The optical sensor 56 and second web 16 are cooperatively configured so that the optical sensor can sense each eye mark of a series of eye marks defined by the second web, wherein the series of eye marks extends in the machine direction. The controller 44 is in communication with the optical sensor 56 and the laser head 40 by way of respective communication paths 58 that can each include a wired electrical communication path and/or a wireless (e.g., radio wave) communication path. In response to sensing an eye mark, the optical sensor 56 can provide a signal to the controller 44, and the controller can responsively send a signal to the laser head(s) 40, so that the laser head(s) form the indicia 18 at predetermined locations in the metallic layer 20 of the first web 14.

The laser head 40, controller 44 and optical sensor 56 can be configured (e.g., by way of a computer processor, computer memory and computer software of the controller) so that the position of each indicia 18 can be precisely controlled in a predetermined manner. As one example for the embodiment in which the packaging material 12 is formed into packages, each package can include only one of the indicia 18, and that indicia can be located at a predetermined position in the package. For example, if desired, the indicia 18 can be placed in register with (e.g., superposed with) predetermined corresponding print defined by the ink 52. Alternatively, more than one indicia 18 can be included in each package.

In the embodiment depicted in FIG. 1, the laminating comprises the first and second webs 14, 16 being drawn through a nip (e.g., a relatively narrow gap between a pair of the rollers 28). The laminating typically includes extrusion or coextrusion lamination with adhesive material 60 being provided between the first and second webs 14, 16 at a position proximate (e.g., slightly upstream of) the nip. The adhesive material 60 can be a molten thermoplastic material (e.g., hot melt adhesive) that solidifies into an interior polymeric layer 60 (e.g., a transparent, translucent and/or colored layer comprising polyethylene and/or other suitable material) that fixedly secures the first and second webs 14, 16 to one another to form the packaging material 12. Alternatively, the laminating can be facilitated by other suitable techniques.

Figure 6:
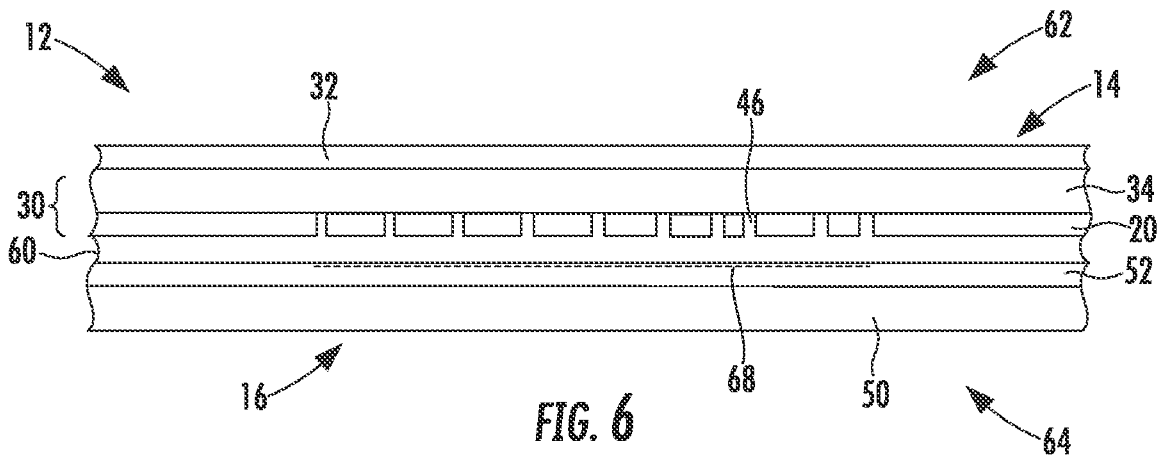
FIG. 6 is a cross-sectional view of a portion of the packaging material of FIG. 1, wherein the cross-section is taken along line 6-6 of FIG. 1, and the cross section intersects indicium or indicia of the first web.

Referring to FIG. 6, it is believed that some of the adhesive material 60 may optionally flow at least partially into the holes 46 in the metallic layer 20 so that the resulting interior polymeric layer 60 may at least partially form the indicia 18. For example, it is believed that the adhesive material 60 between the first and second webs 14, 16 may extend into, and may at least partially fill, one or more of the holes 46 in the metallic layer 20. Additionally, the interior polymeric layer 60 can optionally include one or more colorants (e.g., pigment), so that the interior polymeric layer is a different color than the metallic layer 20. This color contrast may at least partially form the indicia 18 and/or may enhance the visibility of the indicia, as will be discussed in greater detail below. As one example, the color of the interior polymeric layer 60 can be white, and the metallic layer 20 can be silvery, although other colors are within the scope of this disclosure. For example, the color of the interior polymeric layer 60 can be white, red, blue, yellow and/or any combination thereof.

In FIG. 1, arrow A and arrow 7 identify lines of sight that extend toward one another, and are coaxial with one another and the cross-sectional line 6-6. FIG. 3 schematically represents a view of a portion of the packaging material 12 from the line of sight identified by arrow A in FIG. 1.

Figure 7:
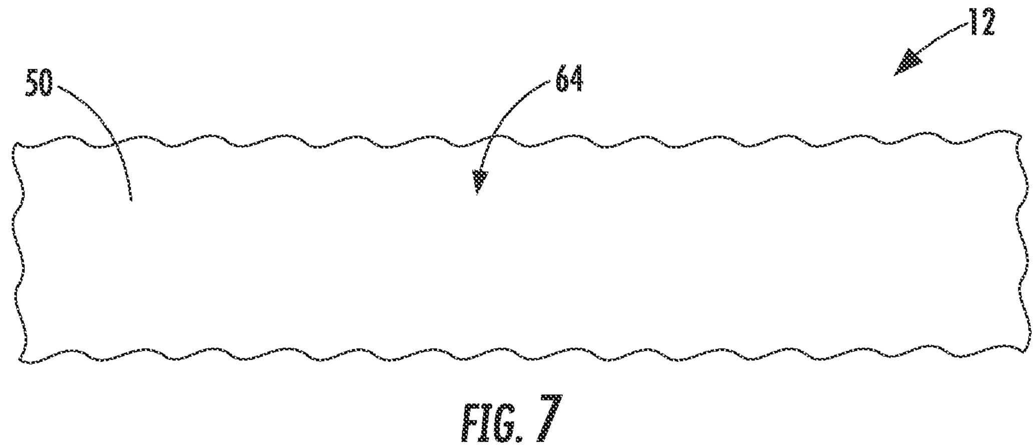
FIG. 7 depicts a portion of the packaging material of FIG. 1, wherein arrow 7 in FIG. 1 indicates the line of sight for FIG. 7, and the line of sight is aligned with indicium or indicia of the packaging material.

In contrast to FIG. 3, FIG. 7 is a schematic view of a portion of the packaging material 12 from the line of sight identified by arrow 7 in FIG. 1. As apparent from the contrast between FIGS. 3 and 7, the indicia 18 can be visible from a first side 62 (FIGS. 1, 3 and 6) of the packaging material 12 (e.g., through the heat-sealable layer 32 and interior polymeric film 34), and that same the indicia 18 can be substantially not visible from the opposite second side 64 (FIGS. 1, 6 and 7) of the packing material (e.g., through the second web 16 and interior polymeric layer 60). More specifically, the indicia 18 is typically visible (e.g., the indicia 18 can be visible with a naked, bare or unaided eye) from first side 62 of the packaging material 12. In contrast, the indicia 18 is typically substantially not visible (e.g., not visible with a naked, bare or unaided eye) from the second side 64 of the packing material 12.

In the embodiment depicted in the drawings, the indicia 18 is typically substantially not visible from the second side 64 of the packing material 12 because, for example, the laser head 40/laser beam is restricted (e.g., prevented) from distorting (e.g., forming the indicia 18 in) the second web 16. For example and as depicted in FIG. 1, the laser beam can be shielded from and/or directed away from the second web 16. Additionally, the second web 16 (e.g., the outer polymeric film 50 and/or ink(s) 52) and/or the interior polymeric layer 60 can be sufficiently opaque to restrict (e.g., prevent) the indicia 18 from being visible from the second side 64 of the packing material 12. For example, the ink(s) 52 can define (e.g., depict) graphic(s) (e.g., indicium, indicia, and/or picture(s)) configured to at least partially restrict (e.g., mask and/or restrict (e.g., prevent)) the indicia 18 from being visible from the second side 64 of the packing material 12.

At least partially reiterating from above with reference to FIG. 6, in an embodiment in which the interior polymeric layer 60 is a different color than the metallic layer 20, the portions of the colored interior polymeric layer that are in the holes 46 and/or superposed with the holes 46 may be at least partially visible through the first side 62 of the packaging material 12 to at least partially define the indicia 18. For example, the interior polymeric layer 60 may be dyed so that it is a relatively dark color (e.g., blue and/or black) that seeks to enhance visibility of the indicia 18. In contrast to the heat-sealable layer 32 and interior polymeric film 34, the metallic layer 20 can be opaque, at least partially opaque, or the like. Accordingly, the portions of the colored interior polymeric layer 60 that are not superposed with, or in, the holes 46 may be substantially not visible through the first side 62 of the packaging material 12.

In another embodiment in which the interior polymeric layer 60 is transparent and/or translucent, the indicia 18 may be substantially not visible through the first side 62 of the packaging material 12 when the packaging material 12 is not illuminated from behind (e.g., when light is not shining onto the second side 64 of the packing material). On the other hand, in the embodiment in which the interior polymeric layer 60 is transparent and/or translucent, the indicia 18 may be visible through the first side 62 of the packaging material 12 when the packaging material 12 is illuminated from behind (e.g., when light is shining onto the second side 64 of the packing material). Accordingly, a method of this disclosure can include viewing the indicia 18 through the first side 62 of the packaging material 12 while illuminating (e.g., shining light onto) the second side 64 of the packing material. The method can include the indicia becoming visible, or at least further visible, through the first side 62 of the packaging material 12 in response to the illuminating of the second side 64 of the packing material.

In a further embodiment in which the interior polymeric layer 60 is transparent and/or translucent, predetermined portions of the ink 52 superposed with the holes 46 may be at least partially visible, by way of the holes 46 in the metallic layer 20, through the first side 62 of the packaging material 12 to at least partially define the indicia 18. As an example, dashed lines in FIG. 6 schematically depict the predetermined portions 68 of the ink 52 that are superposed with the holes 46 and at least partially visible, by way of the holes 46 in the metallic layer 20, through the first side 62 of the packaging material 12 to at least partially define the indicia 18. The predetermined ink portions 68 can be at least one relatively dark color (e.g., blue and/or black) that seeks to enhance visibility of the indicia 18. In contrast to the heat-sealable layer 32, interior polymeric film 34, and interior polymeric layer 60, the metallic layer 20 can be opaque, at least partially opaque, or the like. Accordingly, the portions of the ink 52 (e.g., predetermined ink portions 68) that are not superposed with the holes 46 may be substantially not visible through the first side 62 of the packaging material 12.

The predetermined ink portions 68 can be positioned between the interior polymeric layer 60 and respective portions of the ink 52 that define the one or more graphics (e.g., see graphics 72 of FIGS. 8 and 9) that are visible through the outer polymeric film 50. In some embodiments, it is believed that predetermined portions of the ink 52 (e.g., predetermined portions of the graphics 72) can cover the predetermined ink portions 68 so that the predetermined ink portions 68 are substantially not visible through the outer polymeric film 50. Further regarding the predetermined ink portions 68, the first embodiment predetermined ink portions 68 are predetermined portion(s) of the second web 16. More generally these predetermined portion(s) of the second web 16, which are a different color than the metallic layer 20, can be any suitable material that may be colored by one or more pigments, dyes, and/or other suitable colorants. Even more generally, the laminate or packaging material 12 can include material (e.g., the ink 52, predetermined ink portions 68, and/or interior polymeric layer 60) that is a different color than the metallic layer 20, and the different color can be at least partially visible through the holes 46 and, thus, at least partially define the indicia 18.

Figure 8:
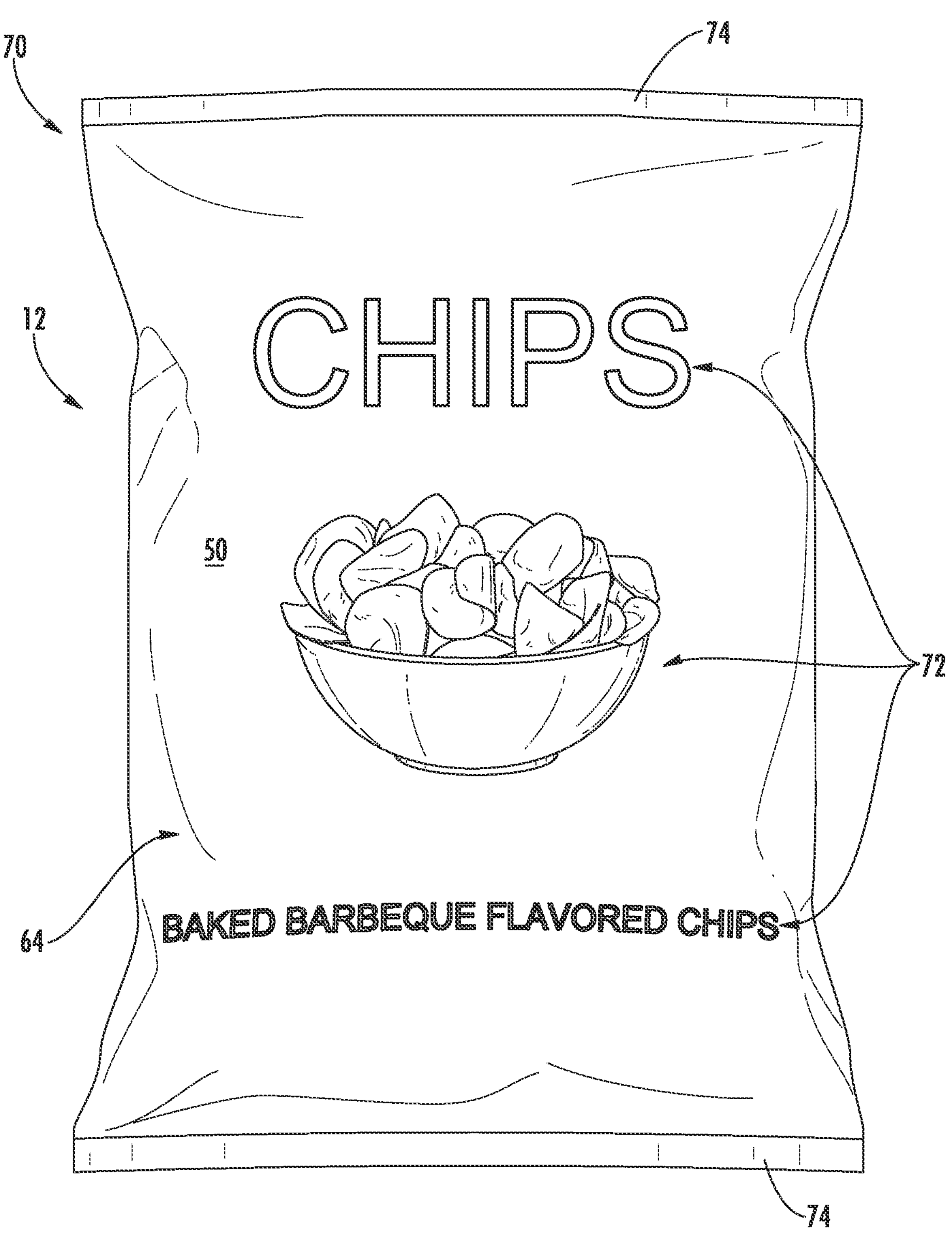
FIG. 8 is a front view of a closed bag formed from the packaging material of FIG. 1, in accordance with an embodiment of this disclosure.
Figure 9:
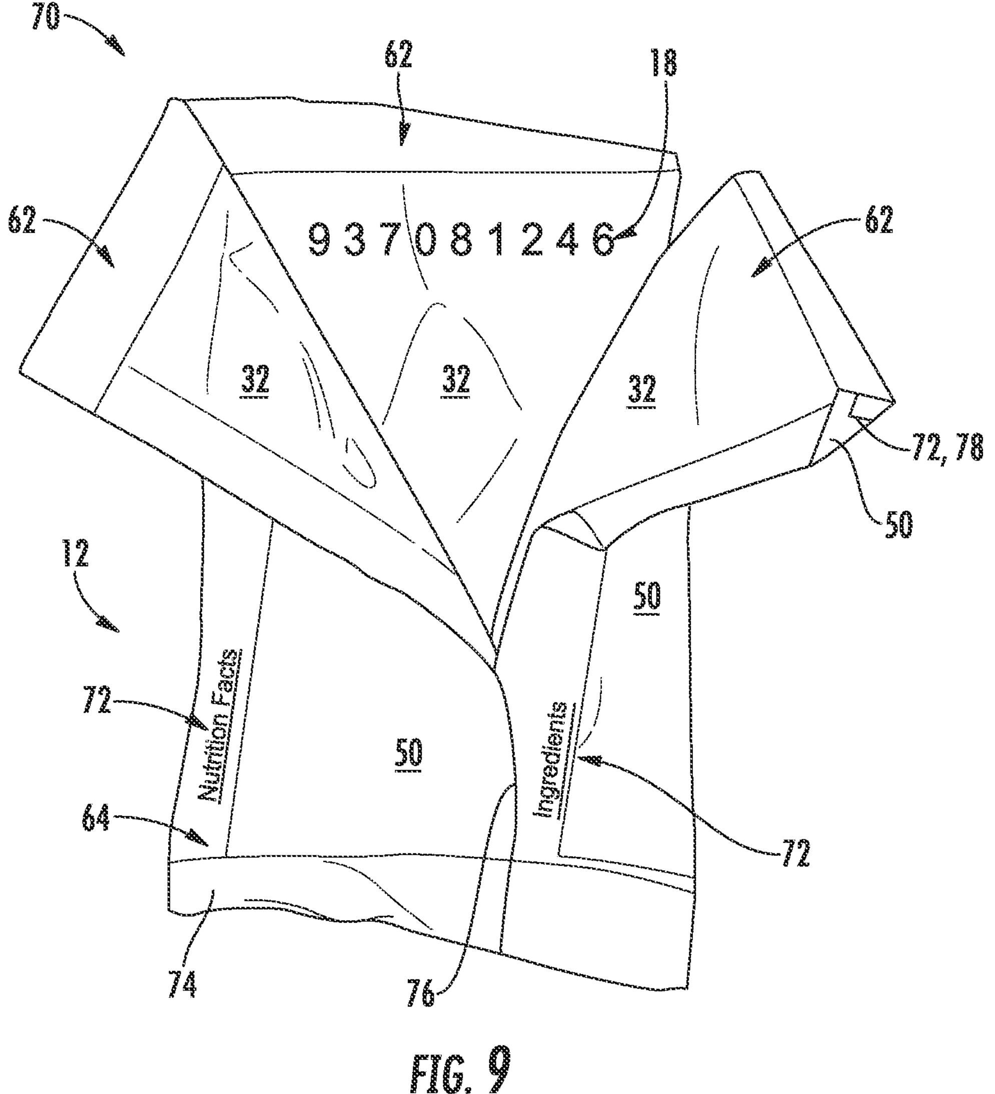
FIG. 9 is a rear view of the bag of FIG. 8 in an open configuration.

As an example, FIG. 8 is a front view of a closed package, or more specifically a closed bag 70, formed from a piece of the above-discussed packaging material 12. In the example of FIG. 8, the second web 16 (FIGS. 1, 5 and 6), or more specifically the outer polymeric film 50 of the second web, defines the outer surface of the bag 70. Also in the example of FIG. 8, the outer polymeric film is transparent so that graphics 72 defined by the one or more inks 52 (FIGS. 5 and 6) are visible through the outer polymeric film 50 when viewing the outer surface 64 of the bag. In the example of FIG. 8, the packaging material 12 (e.g., a laminate) extends around an interior space of the bag 70, and the bag is closed by seams configured to at least partially obstruct access to the interior space of the bag. Referring to FIGS. 8 and 9, the seams can respectively be in the form of, or can be defined by seals. The seals can be lap seals, fin seals, and/or any other suitable seals. In the example of FIG. 9, the seals include opposite end seals 74 and a lengthwise seal or fin seal 76. The lengthwise or fin seal 76 typically extends from one to the other of the end seals 74. The lengthwise seal or fin seal 76 can be a lap seal or any other suitable seal.

The bag 70 can be formed by folding the piece of packaging material 12 onto itself, so that respective marginal portions of the heat-sealable layer 32 are in opposing face-to-face contact with one another, and heat and pressure can be applied to those marginal portions to form the seals 74, 76. Alternatively, the heat-sealable layer 32 may be omitted, and the seals 74, 76 can be formed using a cold-seal adhesive, or in any other suitable manner. The package, or more specifically the bag 70, can completely enclose one or more articles (e.g., food products or any other suitable articles) in a hermitically sealed manner.

In the example of FIG. 8, the indicia 18 is not visible from the outside of the bag 70. In contrast, FIG. 9 depicts the bag 70 in an open configuration, and the indicia 18 is visible when viewing the inner surface 62 of the bag. In the example of FIG. 9, the graphics 72 include at least one eye mark 78.

As an example, the laser head 40 can include or otherwise be associated with a pulsed fiber laser, or any other suitable laser. The system 10 can be operated with the laser system deactivated when the inclusion of the indicia 18 in the packaging material 12 is not desired.

The controller 44 can comprise at least one digital computer including, for example, one or more of each of a central processing unit or processor, computer hardware integrated circuits or memory, data storage, and/or equipment interfaces. For example, the equipment interfaces of the controller 44 can be respectively operatively associated with the laser 40, optical sensor 56, and/or other suitable features. As another example, one or more of the equipment interfaces of the controller 44 can be operatively associated with one or more user interfaces configured to allow a user to provide commands and information to the controller, and configured to allow the controller to output information to the user. For example, the input-type feature(s) of the user interfaces can include a keyboard, a cursor control device (e.g., a mouse), a visual display with touch functionality (e.g., capacitive or other sensors that are configured to detect physical contact), and/or any other suitable devices. As additional examples, the output-type feature(s) of the user interfaces can include a display device (e.g., a monitor or projector), speaker, and/or any other suitable devices. The controller can be in the form of a distributed computing system; therefore, the features of the system controller can be spread between separate computers. Features of the controller, user interfaces, and/or other associated devices may be implemented in various manners, including software, hardware, firmware, or any combinations thereof, for facilitating respective aspects of this disclosure.

In other embodiments of this disclosure, the packaging material 12 can include one or more different, additional, or less layers of material. For example and at least partially reiterating from above, the heat-sealable layer 32 and/or ink(s) 52 can be omitted. As another example, it is believed that the metallic layer 20 can be replaced with and/or supplemented with one or more other types of materials that are susceptible to being laser marked and/or laser engraved by the laser beam projected from laser head 40. More generally, it is within the scope of this disclosure for the indicia 18 to be defined in predetermined layer(s) (e.g., the metallic layer 20 and/or other suitable layer(s)) of the packaging material 12 by laser marking and/or laser engraving the predetermined layer(s) with the laser beam projected from laser head 40.

In the specification and/or figures, examples of embodiments have been disclosed. The present invention is not limited to such exemplary embodiments. Unless otherwise noted, specific terms have been used in a generic and descriptive sense and not for purposes of limitation. The use of the term "and/or" includes any and all combinations of one or more of the associated listed items.

The invention claimed is:

1. A method of at least forming a packaging material, the method comprising:

laminating at least a first web and a second web to one another to at least partially form the packaging material;

while the laminating is occurring, defining indicium in at least a metallic layer of the first web, wherein at least a portion of the defining is performed at a position that is upstream from the laminating; and the packaging material being configured so that the indicium is visible from a first side of the packaging material, and the indicium is substantially not visible from a second side of the packaging material, wherein the first and second sides are opposite from one another.

2. The method according to claim 1, further comprising forming a portion of the packaging material into a package that is configured so that:

the first web defines an inner surface of the package, and the indicium is positioned for being seen by viewing the inner surface of the package.

3. The method according to claim 2, further comprising:

opening the package; and viewing the indicium, comprising viewing the inner surface of the package.

4. The method according to claim 1, wherein the defining of the indicium comprises removing predetermined portions of the metallic layer.

5. The method according to claim 4, further comprising forming a portion of the packaging material into a package that is configured so that:

the first web defines an inner surface of the package, and the indicium is positioned for being seen by viewing the inner surface of the package.

6. The method according to claim 5, further comprising:

opening the package; and viewing the indicium, comprising viewing the inner surface of the package.

7. The method according to claim 1, wherein the defining of the indicium comprises removing predetermined portions of the metallic layer by way of laser ablation.

8. The method according to claim 7, further comprising forming a portion of the packaging material into a package that is configured so that:

the first web defines an inner surface of the package, and the indicium is positioned for being seen by viewing the inner surface of the package.

9. The method according to claim 8, further comprising:

opening the package; and viewing the indicium, comprising viewing the inner surface of the package.

10. The method according to claim 1, wherein the indicium comprises one or more markings selected from the group consisting of numbers, letters, graphics and symbols.

11. The method according to claim 10, further comprising forming a portion of the packaging material into a package that is configured so that:

the first web defines an inner surface of the package, and the indicium is positioned for being seen by viewing the inner surface of the package.

12. The method according to claim 11, further comprising:

opening the package; and viewing the indicium, comprising viewing the inner surface of the package.

13. The method according to claim 1, wherein:

the laminating comprises simultaneously drawing the first web and the second web through a nip, and providing material between the first web and the second web in the nip;

the material comprises a different color than the metallic layer; and the different color is at least partially visible through the indicium.

14. The method according to claim 13, further comprising forming a portion of the packaging material into a package that is configured so that:

the first web defines an inner surface of the package, and the indicium is positioned for being seen by viewing the inner surface of the package.

15. The method according to claim 14, further comprising:

opening the package; and viewing the indicium, comprising viewing the inner surface of the package.

16. The method according to claim 1, wherein the indicium is substantially not visible through the second web.

17. The method according to claim 16, further comprising forming a portion of the packaging material into a package that is configured so that:

the first web defines an inner surface of the package, and the indicium is positioned for being seen by viewing the inner surface of the package.

18. The method according to claim 17, further comprising:

opening the package; and viewing the indicium, comprising viewing the inner surface of the package.

19. A method of using a package, the method comprising:

opening the package, comprising transitioning the bag from a closed configuration to an open configuration, and then viewing indicium of the package while the package is in the open configuration, wherein:

in the closed configuration, the package comprises a laminate extending around an interior space of the package, the laminate comprises a first web and a second web that are joined to one another, the first web comprises a metallic layer on a second layer, the metallic layer is positioned between the second layer and the second web, the indicium is defined in at least the metallic layer, the packaging material is configured so that the indicium is visible from a first side of the packaging material, and the indicium is substantially not visible from a second side of the packaging material, the first and second sides are opposite from one another, the second web comprises ink and a polymer film, the ink at least partially defines graphics that are visible through the polymer film from the second side of the packaging material, in the closed configuration, the package comprises a seam connecting first and second portions of the laminate to one another, and the seam is configured to at least partially obstruct access to the interior space of the package, the first web defines an inner surface of the package, the second web defines an outer surface of the package, the graphics are positioned for being seen by viewing the outer surface of the package, and the indicium is positioned for being seen by viewing the inner surface of the package, and the viewing of the indicium comprises viewing the inner surface of the package while the package is in the open configuration.

20. The method according to claim 19, comprising:

shining light onto the outer surface of the package, and the indicium becoming at least further visible in response to the shining of the light onto the outer surface of the package.

* * * * *